(No Model.)

W. D. McDANIEL.
TROLLEY RESTORING ATTACHMENT.

No. 542,002. Patented July 2, 1895.

Witnesses
P. H. Aagle.
L. Douville.

Inventor
William D. McDaniel
By John A. Wiedersheim
Attorney

UNITED STATES PATENT OFFICE.

WILLIAM D. McDANIEL, OF PHILADELPHIA, PENNSYLVANIA, ASSIGNOR OF ONE-HALF TO LUTHER S. GREEN, OF SAME PLACE.

TROLLEY-RESTORING ATTACHMENT.

SPECIFICATION forming part of Letters Patent No. 542,002, dated July 2, 1895.

Application filed October 29, 1894. Serial No. 527,267. (No model.)

*To all whom it may concern:*

Be it known that I, WILLIAM D. MCDANIEL, a citizen of the United States, residing in the city and county of Philadelphia, State of Pennsylvania, have invented a new and useful Improvement in Restoring Attachments to Trolley-Wheels, which improvement is fully set forth in the following specification and accompanying drawings.

My invention consists in providing a trolley-wheel with pulleys mounted independently of the same and so constructed that should said wheel be laterally displaced or disconnected from the wire said pulleys will contact with the wire and thus restore the wheel to its operative position.

Figure 1:
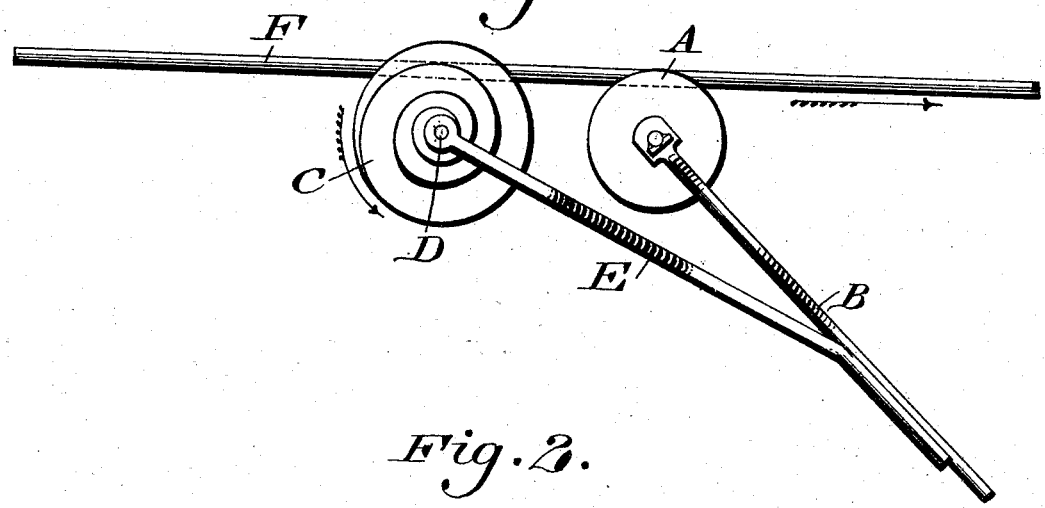
Figure 2:
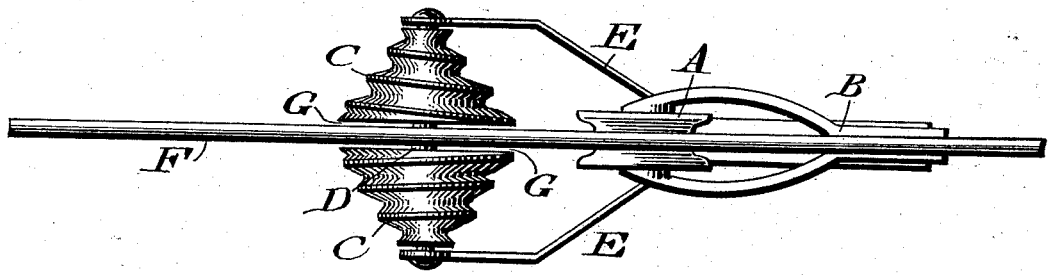
Figure 3:
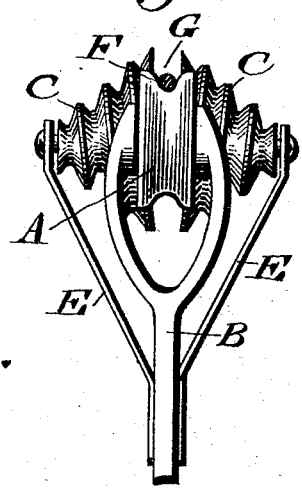

Figure 1 represents a side elevation of a trolley-wheel with the attachment thereto embodying my invention. Fig. 2 represents a top or plan view thereof. Fig. 3 represents a front view thereof.

Similar letters of reference indicate corresponding parts in the several figures.

Referring to the drawings, A designates a trolley-wheel and B the arm thereof, both in general respects of usual construction.

C designates spirally-grooved pulleys, which are mounted on the shaft D, whose bearings are on the arms E, which, located in the present case in the rear of the arms B, are connected with the latter, said pulleys being on opposite sides of the wire or conductor F and separated at their inner ends and having their grooves in reverse order toward the center of the shaft. The diameters of the pulleys are greater than that of the wheel A, as shown in the several figures.

The operation is as follows: The wheel A, when in normal or operative position, runs on the wire or conductor F, as usual. Should the same however jump the wire or be otherwise displaced, the wheel will lower from the wire and move laterally, whereby either of the pulleys C will be placed under the wire. The wheel then rises and the pulley contacts with the wire, whereby the traction on the wire in the groove of the pulley causes the arms E and B, and consequently the wheel A, to be moved centrally under the wire. The wire then clears the inner end of the pulley and is received in the space centrally between the pulleys, so that the arms E and B are permitted to rise when the wheel A contacts with the wire and is in position for service, the wire being in the space G, whose walls also assist in preventing lateral displacement of said wheel A.

Having thus described my invention, what I claim as new, and desire to secure by Letters Patent, is—

1. The restoring pulleys C mounted on the bearings E, independent of the bearings of a trolley wheel, and having a space at their inner ends, the diameters of said pulleys being greater than that of said wheel, and the parts combined substantially as described.

2. The arms E connected to the arm of a trolley wheel, the shaft D mounted on said arm E, and the spirally-grooved pulleys C on said shaft D, having an intervening space, said shaft D being in rear of said wheel, substantially as described.

WILLIAM D. McDANIEL.

Witnesses:
JOHN A. WIEDERSHEIM,
R. H. GRAESER.